United States Patent

Vafai

[19]

[11] Patent Number: 5,825,910
[45] Date of Patent: Oct. 20, 1998

[54] AUTOMATIC SEGMENTATION AND SKINLINE DETECTION IN DIGITAL MAMMOGRAMS

[75] Inventor: Shohreh Vafai, Roswell, Ga.

[73] Assignee: Philips Electronics North America Corp., New York, N.Y.

[21] Appl. No.: 728,677

[22] Filed: Oct. 2, 1996

Related U.S. Application Data

[63] Continuation of Ser. No. 175,805, Dec. 30, 1993, abandoned.

[51] Int. Cl.$^6$ ........................................... G06T 5/20
[52] U.S. Cl. ......................... 382/132; 382/173; 382/266; 378/37
[58] Field of Search .................................. 382/131, 132, 382/266, 173; 378/37, 4; 128/915, 922; 600/425

[56] References Cited

U.S. PATENT DOCUMENTS

| | | | |
|---|---|---|---|
| 4,236,078 | 11/1980 | Kotera et al. | 250/363 R |
| 4,340,911 | 7/1982 | Kato et al. | 358/280 |
| 4,618,990 | 10/1986 | Sieb et al. | 382/43 |
| 4,851,984 | 7/1989 | Doi et al. | 364/413.23 |
| 4,907,156 | 3/1990 | Doi et al. | 364/413.13 |
| 4,951,201 | 8/1990 | Takeo et al. | 364/413.13 |
| 5,003,979 | 4/1991 | Merickel et al. | 364/413.13 |
| 5,133,020 | 7/1992 | Groger et al. | 382/6 |
| 5,142,557 | 8/1992 | Tokar et al. | 378/37 |
| 5,172,419 | 12/1992 | Marian | 382/6 |
| 5,212,637 | 5/1993 | Saxena | 364/413.26 |
| 5,245,539 | 9/1993 | Romeas et al. | 364/413.13 |
| 5,343,390 | 8/1994 | Doi et al. | 364/413.16 |
| 5,351,305 | 9/1994 | Wood et al. | 382/266 |
| 5,365,429 | 11/1994 | Carman | 364/413.13 |
| 5,426,685 | 6/1995 | Pellegrino et al. | 378/87 |
| 5,452,367 | 9/1995 | Bick et al. | 382/128 |

FOREIGN PATENT DOCUMENTS

| | | |
|---|---|---|
| 2622714 | 5/1989 | France . |
| 9007751 | 7/1990 | WIPO . |

OTHER PUBLICATIONS

Gonzalez et al. *Digital Image Processing* Addison–Welsey. 1992, pp. 196–201, 414–421.

Kreyszig. *Advance Engineering Mathematics*, John Wiley & Sons, 1983, pp. 386–391.

Levine, *Vision in Man and Machine* McGraw–Hill Book Company, 1985, pp. 181–183.

R.C. Gonzales et al.; Digital Image Processing; pp. 195–201, 418–419.

"Evaluation of Mammographic Caclifications Using a Computer Program" W. Wee et al., Radiology, vol. 116, pp. 717–720, Sep. 1975.

(List continued on next page.)

*Primary Examiner*—Jon Chang
*Attorney, Agent, or Firm*—Jack D. Slobod

[57] ABSTRACT

Digital mammograms are automatically segmented into background, corresponding to the region external of the breast, and foreground, corresponding to the region within the breast, by the detection of the skinline which forms a border between these regions. A binary array is produced representing an initial coarse segmentation between foreground and background. The binary values are assigned in dependance on the sign of a spatial derivative approximating a gradient normal to the skinline. Spatial derivatives in fixed directions making a substantial angle with respect to the normal to the chest wall approximate the normal to the skinline direction in medial, lateral and lower contour sections of the breast, while a spatial derivative normal to the chest wall approximates the gradient normal to the skinline in anterior and upper contour sections of the breast. The initial coarse segmentation is followed by detection and elimination of expected labels either in the background or attached to the foreground, a tracing of the resultant boundary contour between binary regions, a detection of dominant points along the traced contour, and smoothing between the detected dominant points. A processed mammogram having the detected skinline outlined, is produced and displayed.

13 Claims, 5 Drawing Sheets

OTHER PUBLICATIONS

"Mammogram Inspection by Computer" W. Spiesberger, IEEE Transactions on Biomedical Engineering, vol. BME 26,No. 4, Apr. 1979, pp. 213–219.

"A Stochastic Method for Autmated Detection of Microcalcifications in Digital Mammograms" N. Karssemeijer, Submitted to XIIth Conf. on Inf. Proc. In Med. Imaging, pp. 1–14, Jul. 1991.

"Breast Lesion Classification by Computer and Xeroradiograph" L. Ackerman et al, Cancer, vol. 30, pp. 1025–1035.

"Image Feature Analysis and Computer–Aided Diagnosis in Digital Radiography" H. Chan et al, Medical Physics, vol. 14, No. 4, pp. 538–548, Jul. 1987.

"Mammographic Feature Enhancement by Computerized Iamge Processing" A. Dhawan et al, Computer Methods and Programs in Biomedicine, vol. 27, pp. 23–35, 1988.

"Automated Detection of Microcalcification Clusters in Mammograms" I Bankman et al, In S/CAR 90: Comp. App. to Assist Radiology, pp. 137–143, Symposia Foundation, Carlsbad, CA 1992.

"Segmentation of Microcalcifications in Mammograsm" J. Dengler et al, Submitted to IEEE Transactions on Medical Imaging, 1991.

"Automatic Detection of Microcalcifications in Digital Mammograms Using Local Area Thresholding Techniques" D. Davies et al, Medical Imaging III, Image Processing, vol. 1092, pp. 153–159, SPIE 1989.

"Computer Aided Detection of Microcalifications in Mammograms" H. Chan et al Investigative Radiology, vol. 23, pp. 664–671, Sep. 1988.

"Automatic Computer Detection of Clustered Calcifications in Digital Mammograms" D. Davies et al, Phys. Med. Biol. vol. 35, No. 8, 1111–1118.

"Algorithm for the Detection of Fine Clustered Calcifications on Film Mammograms" S. Fam et al, Radiology, vol. 169, pp. 333–337, Nov. 1988.

"The Detection of Calcification Clusters in Film–Screen Mammograms" Fam et al Medical Imaging II vol. 914, pp. 620–634, SPIE, 1988.

"Extraction and Measurement of Lesion Edge Blur in Mammograms by Computer Image Analysis" J. Richter et al, School of Computer Science, The University of Birmingham, U.K.

"Image Processing for Recognition of Tumor on Mammography" S. Yabashi et al Proceedings of the 1989 International Symposium on Noise and Clutter Rejection in Radars . . . .

"Image Processing Algorithms and Techniques III" J. Sullivan, Proceedings of SPIE, Feb. 10–13, 1992 San Jose, CA.

"A Computer Analysis of Mammographic Microcalcifications: Global Approach", by S.H. Fox et al., pp. 624–631.

AUTOMATIC SEGMENTATION AND SKINLINE DETECTION IN DIGITAL MAMMOGRAMS

This is a continuation of application Ser. No. 08/175,805, filed Dec. 30, 1993 now abandoned.

BACKGROUND OF THE INVENTION

1. Field of the Invention

The present invention relates generally to methods of and systems for Computer-Aided Diagnostic Mammography (CADM). In its more particular respects, it relates to automatic segmentation of digital mammograms into background, corresponding to the region external of the breast, and foreground, corresponding to the region within the breast, and automatic detection of a boundary contour or border between these regions.

2. Description of the Related Art

Methods of this general type are known from Nishikawa, R., et al, "Computer-aided detection and diagnosis of masses and clustered microcalcifications from digital mammograms," SPIE 1905–46, February 1993 and from Yin, F. et al, "Computerized detection of masses in digital mammograms: Analysis of bilateral subtraction images," Medical Physics 18 (5), September/October 1991, both reflecting work at the University of Chicago and from Yabashi, S, et al. "Image Processing for recognition of tumor on mammography", Proceedings of the 1989 International Symposium on Noise and Clutter Rejection in Radars and Imaging Sensors.

Breast cancer is one of the primary causes of death for women in western societies. Because the vast majority of deaths due to cancer that originated in the breast could be prevented by early detection, national health organizations in the United States recommend that all women over the age of 50 have regular screening mammograms. If these recommendations were followed by all women, the number of mammograms taken and read in the U.S. would overload the current capacity.

The reading or interpretation of screening mammograms is an art that requires extensive experience and attentiveness to detail. While the mammographer's primary sign for cancer is a mass visible on the mammogram, one of the more sensitive signs is the presence of small relatively bright spots (in film-screen mammography) corresponding to locally increased X-ray attenuation due to minute deposits of calcium salts known as microcalcifications, which are arranged in clusters. In fact, clustered microcalcifications are often the only sign indicating an early in situ malignancy. However, identification of these clusters is difficult because they are frequently obscured by gradations in intensity produced by the surrounding tissue. Both the volume of mammograms to be interpreted and the difficulty of identifying the aforementioned and other not easily recognizable signs of malignancy motivate developments in Computer-Aided Diagnosis of Mammograms (CADM) to at least automatically mark or enhance features of interest, including suspect areas, in images displayed on a monitor for interpretation by the mammographer.

Digital mammograms suitable for computer-aided diagnosis may be obtained by scanning film taken by conventional X-ray mammography or by utilizing other X-ray detector types that produce electronic image signals that may be directly digitized without the necessity of producing a film intermediate. These detector types include X-ray image intensifier/camera chain, photostimuable phosphor plate/laser readout (see U.S. Pat. No. 4,236,078), and selenium plate/electrometer readout technologies. Such technologies are progressing in their spatial resolution and contrast sensitivities achieved and the latter two, particularly, may soon find widespread use for mammographic applications.

One of the early steps in a CADM system is to segment the image into foreground (corresponding to the breast) and background (corresponding to the external surround of the breast). This segmentation reduces the amount of further processing because extraneous pixels belonging to the background, which may be as many as two thirds of the pixels in the image, are removed from further consideration. The segmentation also produces information from which the boundary contour or border between the foreground and the background, theoretically at the skinline, could be ascertained. An understanding of how mammographers utilize the skinline in film-screen mammography today would be helpful at this point.

Mammographers review X-ray films of breasts taken from different views or projection directions. These include the head-to-toe viewing direction known as cranio-caudal (CC), the side-to-side viewing directions known as medio-lateral (ML) or lateral-medial (ML) and the viewing direction which is typically at a 45° angle between head-to-toe and side-to-side known as oblique (OB). Due to the varying composition of the breast (a mixture of fat, parenchyma and stroma tissues) the contrast seen on mammograms varies tremendously across images. Often the skinline is not visible in one or all of these views. When a mammographer is not able to see the skinline on the viewing box, a special high intensity incandescent light, known as a hot light, is used to help locate the skin boundary and the subcutaneous region below it.

Locating the skinline is important to a mammographer in two respects. First, in and by themselves, skin conditions have diagnostic significance. Thickening in the skin and skin retractions are indications of malignancy. Conversely, microcalcifications found on, or immediately below the skinline are considered benign. Second, the skinline acts as a landmark. The locations of abnormalities, in many instances, are reported relative to the skinline, e.g. 2 cm. below the skinline. In addition, once a mammographer finds a suspicious lesion in one view, he must locate the same in another view. He does this by measuring the distance between the detected object and the skinline in one view and by looking for a similar object in the second image on an imaginary line the same distance away from the skinline. Finally, the mammographer has to assure that equal amounts of tissue, between skinline and chest wall, are visualized in all views taken. Routinely, the distance between a point on the skinline (typically the nipple) to the edge of the film in the direction of the chest wall is measured for all views. These distances should be approximately equal. If there are large discrepancies, the films are retaken.

Other uses of the skinline is as a registration aid in comparing images of the left and right breasts, or in comparing views of the same breast taken at different times, e.g. current and last previous studies. Lastly, the skinline can help in detection of the nipple, which like the skinline, is also a landmark. Unless the nipple is marked by a metal bead, it is very difficult to detect. Often, it is not visualized in profile due to patient positioning or rolling over of the skin. The detection of the skinline can guide the search for the nipple.

In the aforementioned publications reflecting work at the University of Chicago, the background is separated from foreground by an initial global threshold operation. This is followed by a morphological close operation to separate the gland from the noisy exterior. A tracking scheme using 4-point connectivity is used to trace the border. The border is smoothed using a running average of border coordinates. This is done independently for images of right and left sides. However, the smaller of the two detected borders is chosen and superimposed on both images for subsequent processing.

The problem with the aforementioned prior art methods is their use of a global threshold to accomplish the initial segmentation. One difficulty is in automatically selecting a meaningful threshold. Another difficulty is that whatever threshold is chosen, it may not consistently and reliably segment the mammogram because, due to noise and artifacts, the gray levels in the background and foreground can overlap and/or may necessitate manual cropping to eliminate background artifacts. Such manual cropping will become more difficult once American College of Radiology (ACR) labeling recommendations are adopted more widely. Further, it has been found that the boundary generated by this prior art method is likely to be at the dense parenchyma below the subcutaneous fatty region of the skin rather than the skinline itself. Since the subcutaneous fatty region could be as thick as 2.5 cm., the tissue erroneously labelled as background could be substantial.

In the Yabashi et al. publication, a one-dimensional gradient operation is applied to individual lines of data, and a threshold is applied to the determined unidirectional gradient generally normal to the chest wall to find the edge of the skin. Such an approach will not adequately segment the breast at contour sections of the breast where the normal to the skinline is significantly different from the normal to the chest wall. It is also not clear how a meaningful gradient threshold should be chosen.

SUMMARY OF THE INVENTION

It is an object of the present invention to provide a method of and system for segmenting digital mammograms into foreground and background which automatically and reliably detects the skinline, in the presence of typical noise and background artifacts, for superposition on a display generated from the mammogram.

It is a further object of the present invention that the skinline be automatically and reliably detected, without the necessity of manually cropping, with the only parameters required being an indication of the view and orientation of the image.

It is yet another object that the foregoing method be computationally efficient so that it could be accomplished within a reasonably small processing time.

These and other objects of the present invention are satisfied by performing the segmentation based on the gradients or spatial derivatives at pixels rather than their amplitudes. As a result of the shape of the breast, the thickness of breast tissue in the viewing direction decreases as the skinline is approached. The gradient of a run of foreground pixels in the vicinity of the skinline tends to be relatively large, to be directed normal to the skinline, and to have a constant sign corresponding to reduced attenuation as the skinline is approached from points within the breast. The key observation is that in the vicinity of the skinline, the foreground has gradients that are substantially different from those of the background. The gradient or spatial derivative is not used to determine precisely where the boundary between foreground and background lies. Rather, its sign is used to create a binary image as a coarse initial segmentation.

The computation of a gradient, however, is expensive in computation time. My experiments have shown that it is not necessary to determine the gradient at each point in the vicinity of the skinline. The spatial derivative in a direction perpendicular to the chest wall is a good approximate measure of the gradient in the vicinity of the skinline in the anterior part of the breast (front half) and a spatial derivative in a direction at a substantial angle with respect to the normal to the chest wall, preferably a 70° angle (i.e. 20° off the chest wall) is a sufficient approximate measure of the gradient in the vicinity of the skinline for the medial, lateral and lower potions of the breast. Since the method depends on the expected anatomy and contouring, the view and the orientation must be provided to the system either explicitly or implicitly.

Using the approximate gradient measures in the regions in which they apply, a binary image is produced representing an initial coarse segmentation of the pixels of the mammogram in the vicinity of the skinline into foreground (e.g. white) and background (e.g. black) based on the sign of the approximate gradient measure. The individual components in the binary image are detected (name label, etc.). All but the foreground, are eliminated (e.g. set to black). Next, heuristics based on the expected anatomy are used to detach the foreground from all other artifacts (if any), which were not previously eliminated because of their connection to the foreground. Then the contour of the resultant object is traced; the dominant points on this contour are detected, and local variations are smoothed. Lastly, all the remaining points are connected to create the skinline and the result is superimposed as a marking on the original image.

BRIEF DESCRIPTION OF THE DRAWING

Other objects, features and advantages of the invention will become apparent upon perusal of the following detailed description when taken in conjunction with the appended drawing, wherein.

DETAILED DESCRIPTION OF THE PREFERRED EMBODIMENTS

Figure 1:
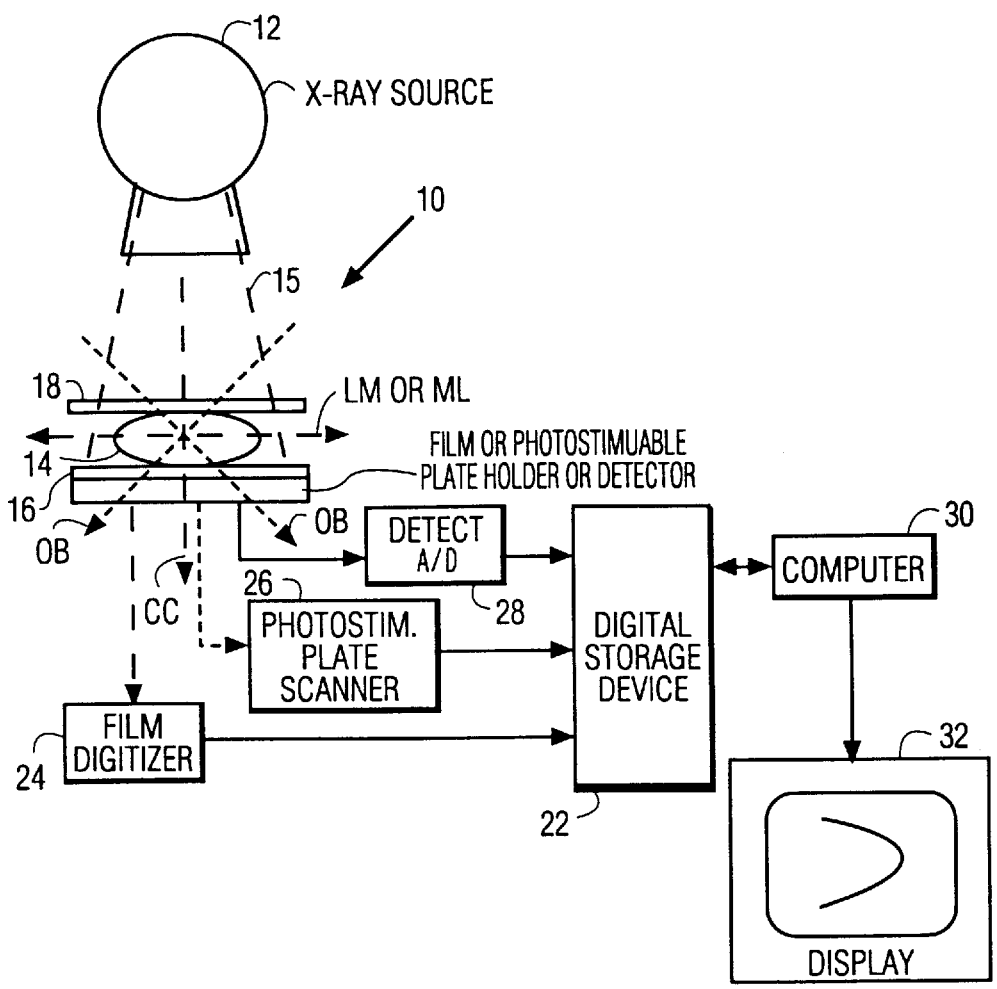
FIG. 1 is a schematic diagram of a computer-aided system in accordance with the invention for taking and processing mammograms.

Referring first to FIG. 1, there is shown a computer-aided mammography system 10, with its mammogram taking parts arranged for a cranio-caudal (CC) view, including an X-ray source 12 directed to irradiate a breast 14 of a standing subject with an X-ray beam 15. The breast 14 is received and compressed between generally planar lower and upper members 16, 18, using a predetermined compression force or weight. Below lower member 16 is a two-dimensional X-ray detector means 22 for detecting within a rectangular field of pixels, the X-ray radiation passing through breast 14 and its immediate external surround. X-ray detector means 22 is alternatively a film or a photostimuable phosphor image plate received in a holder, or a selenium plate/electrometer readout detector. An X-ray image intensifier/camera chain is also a suitable detector means. The X-ray source 12, plates 14 and 16 and detector means 20 may be rotated as a unit about transverse axis A to receive and irradiate breast 14 along any of the viewing directions labelled in FIG. 1 as CC (cranio-caudal), LM or ML (latero-medial or medial-lateral) and OB (oblique).

Whichever detector means 20 type is used, ultimately there is a two-dimensional array of digital pixels, representing the mammogram X-ray projection image, stored as an image file in a digital storage device 22 which may comprise a RAM, hard disk, magneto-optical disk, WORM drive, or other digital storage means. When film is used, it is developed and then scanned in a digitizer 24. Today, films may be digitized to 100 micron spatial resolution, yielding typical images ranging in size from 1672×2380 to 2344×3016 pixels, each up to 12 bit intensity resolution. When a photostimuable plate is used, it is scanned by a laser in scanner 26 yielding a similar image size and typically 10 bit intensity resolution. Lastly, when a detector such as a selenium plate/electrometer readout device is utilized, it directly produces analog electrical signals that are converted to digital form by its digital to digital converter 28.

The two-dimensional array of digital pixels stored in device 22, representing the mammogram, is processed by computer workstation 30 to mark or enhance features of interest in the mammogram, including the skinline, and display the resultant processed mammogram on display device 32, such as a CRT monitor. As a preliminary step, the stored mammogram may be reduced in resolution, spatially by a suitable median filter, and/or in amplitude by truncation, to an image on the order of 500,000 to 2,500,000 pixels and 8-bit to 10-bit intensity resolution consistent with the spatial and gray scale resolution of the monitor. In the processing to mark or enhance features, the mammogram is segmented into foreground, corresponding to the breast, and background, corresponding to the external surround of the breast and the skinline is detected in the course of this segmentation. The segmentation allows background to be eliminated from the search for features of interest, such as masses or clusters of microcalcifications, to be marked or enhanced.

At this point it would be useful to understand the nature of the background portion of a mammogram in a film. The background may be divided into two sections: the background-proper and background-artifacts. The background-proper is ideally the "empty and dark" region. In reality, this region is neither empty nor homogeneously dark. It contains noise, texture from the protective plastic layer of the film, striations and lines caused by rollers in the film processor, and the effects of scattered radiation around the breast boundaries. The digitization process adds further structured and unstructured noise to the image.

Figure 5:
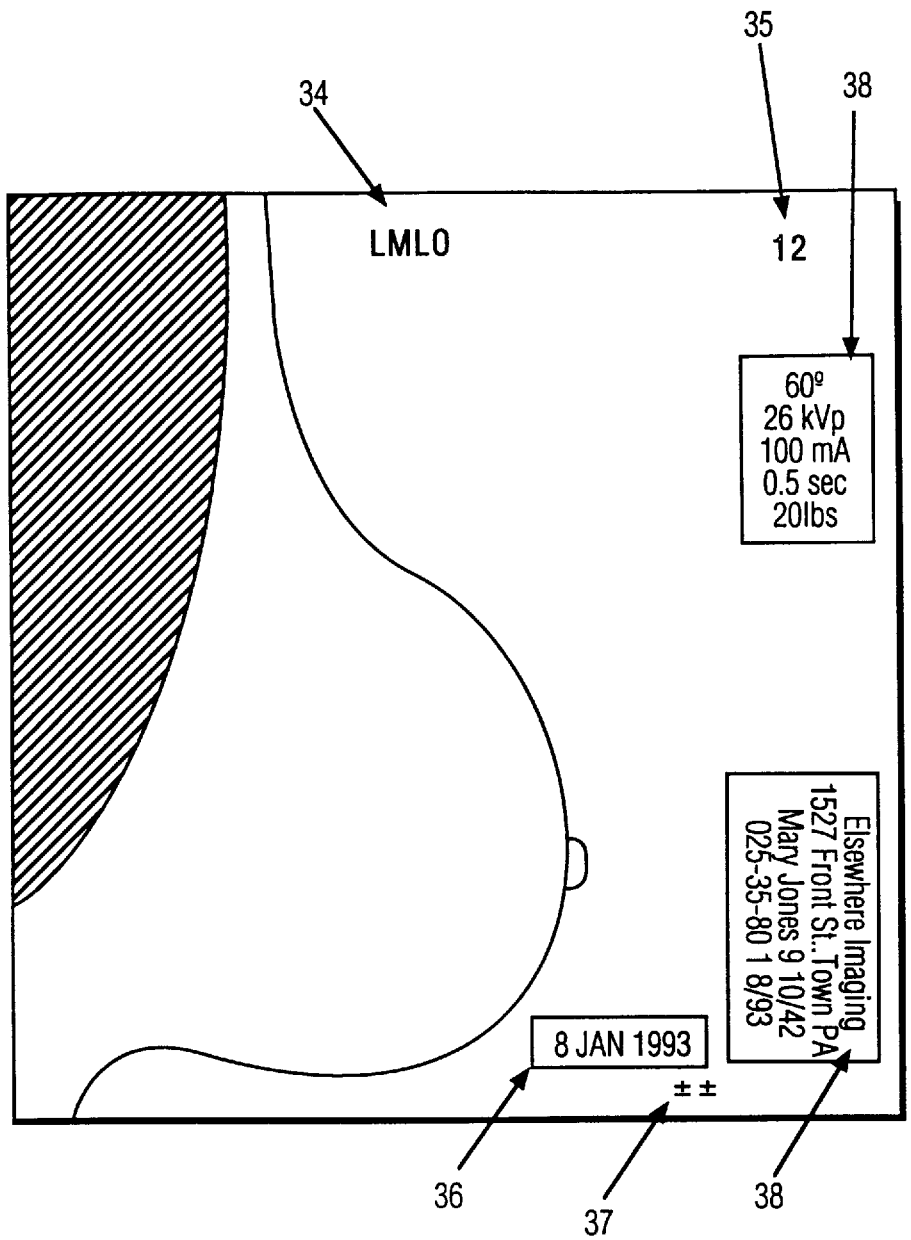
FIG. 5 is a sketch of a mammogram indicating the typical location of labels pursuant to recommendations of the American College of Radiology (ACR).

Background-artifacts refer to a collection of objects in the nature of labels. The labelling recommendations of the American College of Radiology (ACR) is illustrated in FIG. 5. As illustrated, the labels are as follows:

33 patient-facility identification: name, birth date, unique patient number, date of examination and technologist's initials.
34 laterality and view (placed at the side closest to axilla).
35 cassette number (Arabic numeral).
36 date sticker.
37 dedicated unit number (Roman numeral).
38 technical factors.

Figure 2:
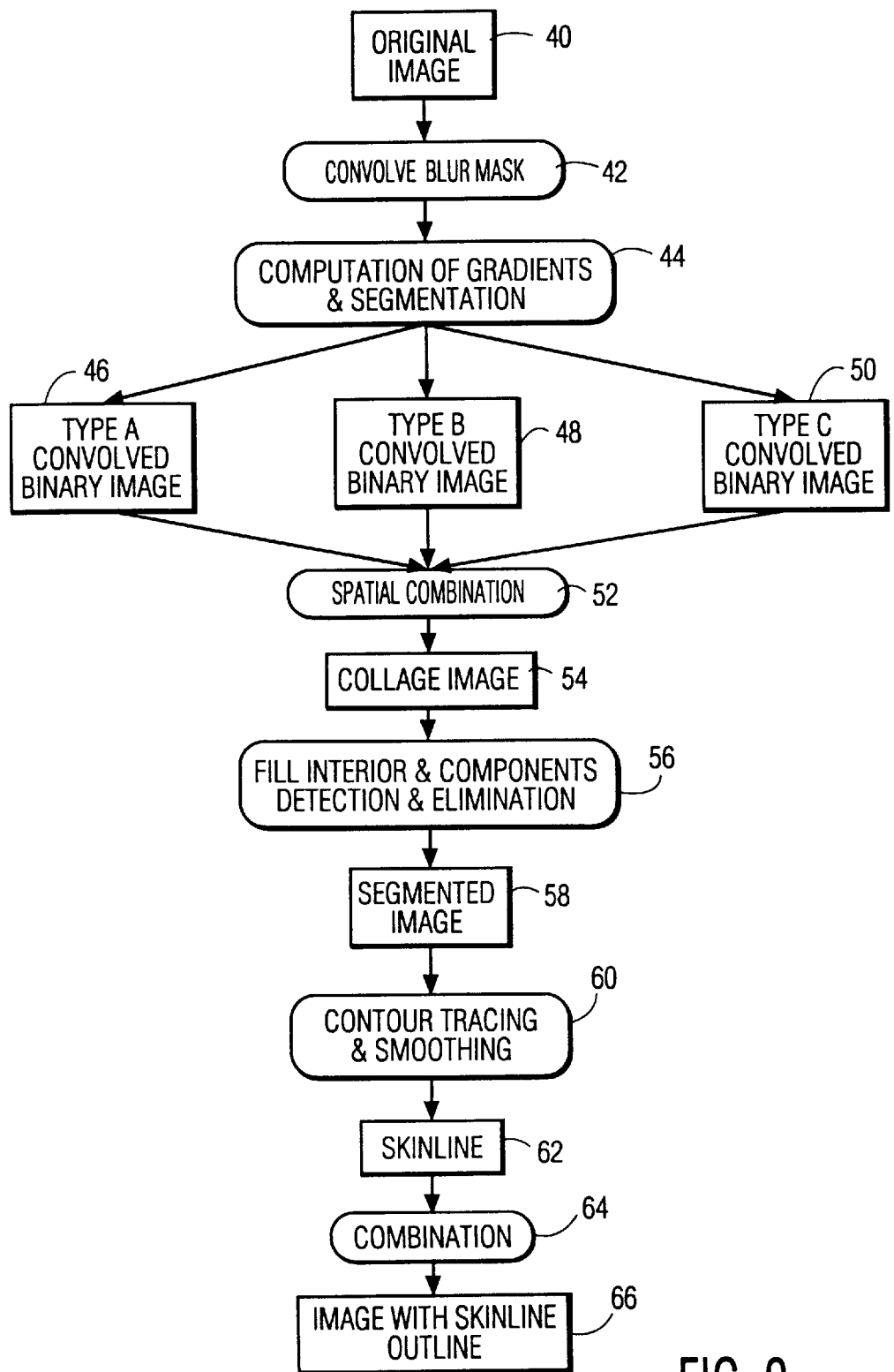
FIG. 2 is a flow chart indicating the processing performed by a computer in FIG. 1.

The procedure carried out by computer 30 is flowcharted in FIG. 2, as an overview. Therein, the stored original image 40 is blurred by convolution 42 with a 5×5 averaging mask of box shape to eliminate some of the noise. The blurred image is then subjected to a computation of gradients and segmentation procedure 44 which produces three individual binary images 46, 48 and 50 (for a cranio-caudal view), each valid for a different contour section of the breast. These three binary images are characterized by pixels lying in a band within the breast and along the skinline contour section for which the images are valid having a binary one value. Then the individually binary images 46, 48 and 50 are spatially combined at 52 into a collage image 54. Thereafter, an interior filling and components detection and elimination procedure 56 is applied to the collage image 54 to fill in the interior of the breast with binary one value and to detect and eliminate extraneous components. This results in the production of a finally segmented binary image 58 which is thereafter subject to a contour tracing and smoothing procedure to produce a detected skinline 62. Lastly, for the purposes of the present invention, at 64 the detected skinline 62 and the original image 40 are combined or superposed to produce an image 66 having the skinline outlined by a suitable marking, such as a bright line. It should be understood that in fact a further processed image is ultimately produced having features of interest marked or enhanced, such as masses and clusters of microcalcifications, which is to be displayed on display device 32 with the skinline outlined. Consequently the marking of the detected skinline may be introduced in the processed image at any appropriate stage in the processing.

In accordance with the present invention, the collage image 54 representing a coarse initial segmentation between breast and background is determined as a function of the spatial derivative or gradient in a direction at least approximately normal to the skinline. This is done by dividing the breast as viewed into two or more contour sections and using a different fixed direction for the spatial derivative taken in each section. As will be seen at least one of the fixed directions makes a significant angle with respect to the normal to the chest wall of the subject, in particular, approximately a 70° angle. While this is the preferable value for the significant angle, an angle of at least 30° would be sufficiently significant to give reasonable results.

Figure 3:
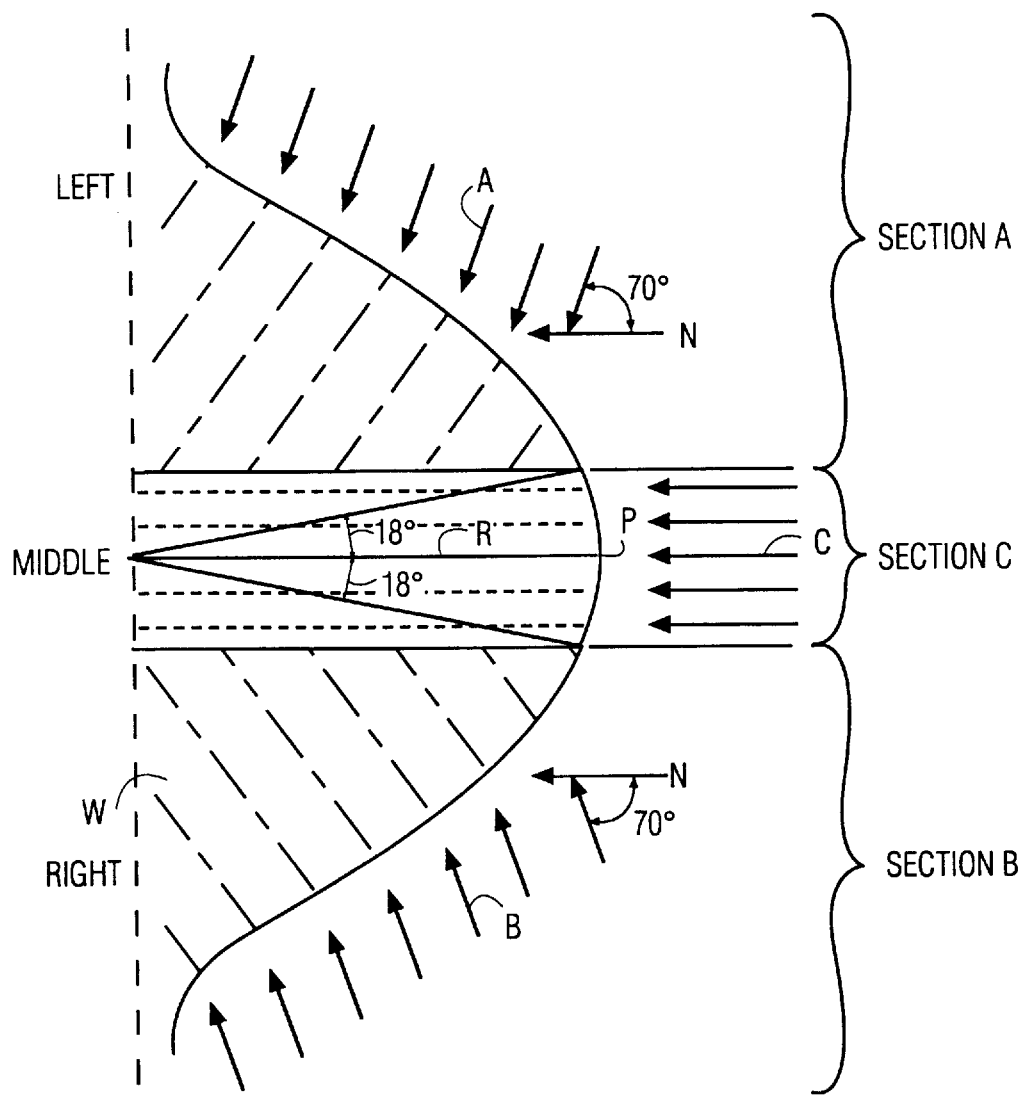
FIG. 3 is a sketch of a mammogram taken from a cranio-caudal (CC) viewing direction, indicating three different sections utilized in the formation of a collage image in the flowchart of FIG. 2.

The computation of gradients and segmentation operation for a cranio-caudal view will be understood by reference to FIG. 3 where the chest wall W should be thought of as oriented horizontally. Therein, the breast as viewed is divided into contour section A on the left side (which is the lateral contour for a left breast and the medial contour for a right breast), contour section B on the right side (which is the medial contour for a left breast and the lateral contour for a right breast), and a central contour section C corresponding to the anterior or middle portion of the breast. The breast image is conveniently divided into these three sections by locating line R perpendicular to chest wall W which goes through the maximum point P on the skinline curvature. This line is taken as the radius of an imaginary semi-circle covering the breast. A central one fifth of the semicircle's perimeter bisected by the line R is taken as the extent of the central contour section C. This corresponds to an arc length of ±18° about line R.

In contour sections A, B, and C, the following 7×7 convolution kernels of type A, B, and C are used, respectively, which are oriented the same as FIG. 3:

```
0  0  0   0  -1   0        0  0  0   1   0   0  0  0
0  0  0   0  -1   0        0  0  0   1   0   0  0  0
0  0  0  -1   0   0        0  0  0   0   1   0  0  0
0  0  0   0   0   0        0  0  0   0   0   0  0  0
0  0  0   1   0   0        0  0  0   0  -1   0  0  0
0  0  1   0   0   0        0  0  0   0   0  -1  0  0
0  0  1   0   0   0        0  0  0   0   0  -1  0  0
       KERNEL TYPE A                KERNEL TYPE B 0  0  0   0   0   0   0
0  0  0   0   0   0   0
0  0  0   0   0   0   0
1  1  1   0  -1  -1  -1
0  0  0   0   0   0   0
0  0  0   0   0   0   0
0  0  0   0   0   0   0
          KERNEL TYPE C
```

The type A kernel computes a spatial derivative or gradient in a direction A making an angle of about 70° with respect to the normal N to the chest wall (i.e. inclined about 20° off the chest wall) and directed both toward the chest wall and from left to center, while the type B kernel computes the spatial derivative in a direction B also making an angle of about 70° with respect to the normal N (i.e. inclined about 20° off the chest wall) and directed toward the chest wall, but from right to center. The type C kernel is essentially one-dimensional because it has non-zero elements only in its central row. It computes the spatial derivative C along normal N and directed toward the chest wall.

After application of kernel type A to contour section A, kernel type B to contour section B and kernel type C to contour section C, the resultant three image matrices of computed spatial derivatives are placed in binary form to produce binary images 46, 48 and 50 by setting each pixel having a computed positive spatial derivative to binary one and all others to binary zero. It is assumed that any areas in these binary images outside of the contour sections they apply to are also set to binary zero if necessary based on the specific combination operation 52 utilized.

Figure 4:
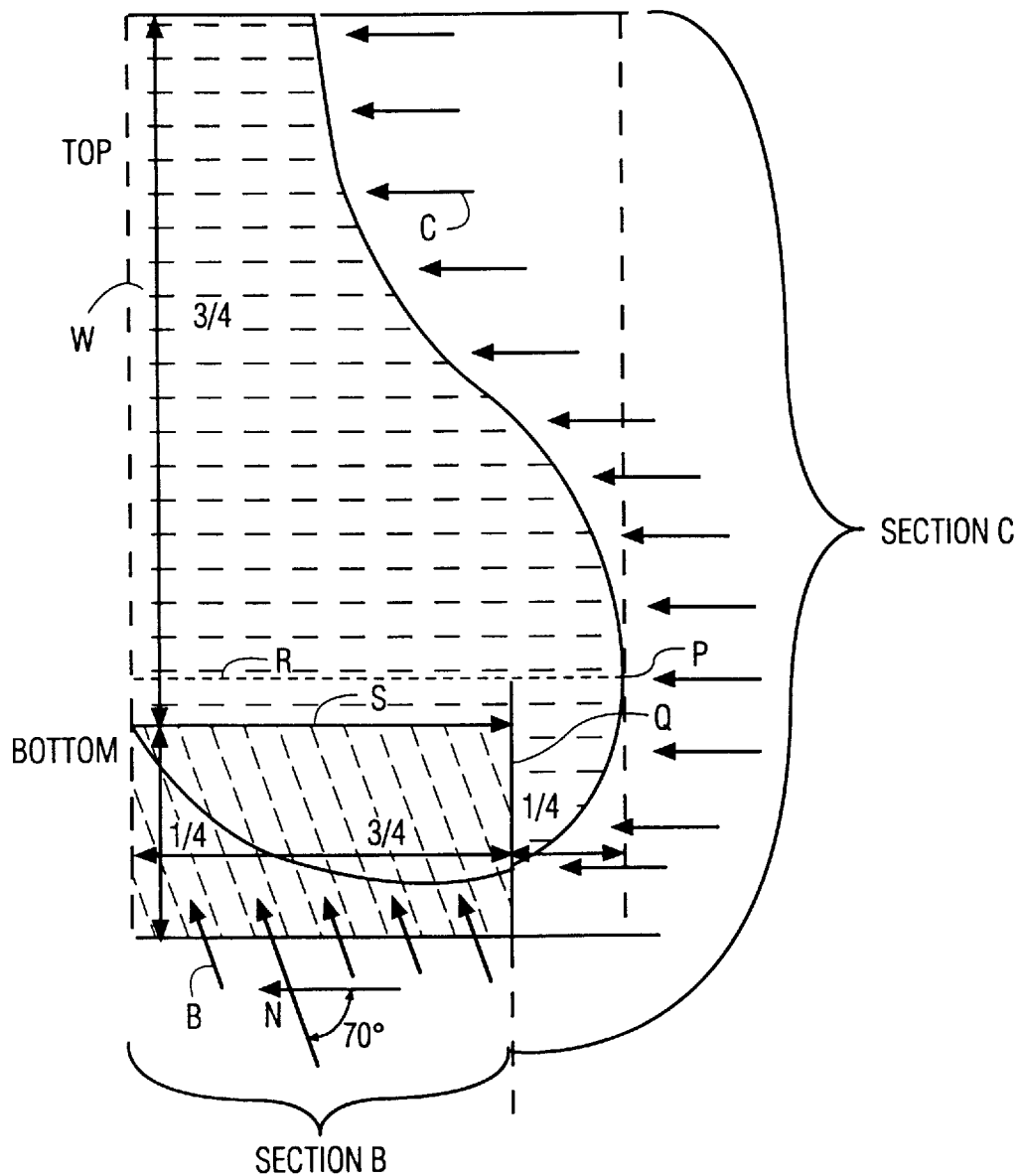
FIG. 4 is a sketch of a mammogram taken from a latero-medial (LM), medial-lateral (ML) or oblique (OB) viewing direction indicating two different sections utilized in forming a collage image similar to the flowchart of FIG. 2.

The computation of gradients and segmentation operation for a latero-medial (LM), medial-lateral (ML) or oblique (OB) view will be understood by reference to FIG. 4 where the chest wall W should be thought of as oriented vertically. Therein kernel type C is utilized for computation of the spatial derivative in the upper and anterior portions of the breast, labelled contour section C, and kernel type B is utilized for computation of the spatial derivative for the lower quadrant labelled contour section B.

The division of the breast image in the view of FIG. 4 into contour sections B and C also begins with locating line R directed perpendicular to the chest wall W from the maximum point P on the breast contour perpendicular, to determine the horizontal extent of the breast in the image. Then, the vertical extent of the image is divided by a line S into an upper ¾ portion and a lower ¼ portion. The horizontal extent along line R is divided by a line Q so that the lower ¼ portion is divided into a rear ¾ area and a front ¼ area. The upper ¾ portion and the front ¼ area of the lower ¼ portion together form contour section C, while the rear ¾ area of the lower ¼ portion forms contour section B.

As with the cranio-caudal view, binary images 48 and 50 are produced by setting the pixels having a computed spatial derivative greater than zero to binary one and all others to binary zero. Only two binary images are produced in this case, since there is no section associated with a kernel of type A. These two binary images are combined spatially at 52 to produce the collage image 54.

For all views, the expectation about gradients or spatial derivatives being directed outward from points within the breast only holds true in the vicinity of the skinline. Consequently, collage image 54 has a "Swiss cheese" appearance with holes in the interior of the gland. It has been found experimentally that with an 8-bit gray scale of values 0 to 255, pixels with intensities greater than 80 in original image 40 do not belong to the background-proper, because the background and foreground overlap in the pixel intensity range of about 30 to 45. Thus, in the beginning of procedure 56, pixels having an intensity of at least 80 in original image 40 are set to binary one in the collage image 54 to fill in the interior of the breast. Next a morphological close operation is applied to detach any sharp projections or narrow bridges of background-proper pixels connected to the main foreground-background border approximately along the skinline. The structuring element for this morphology operation is a 3×3 square.

At this stage, the binary image consists of several large and small components: the foreground, background-proper and background-artifacts. Using a combination line encoding/ line adjacency graph algorithm, for example as disclosed in Pavlidis, T., Algorithms for Graphics and Image Processing, Computer Science Press, Maryland, 1982, P4, first pixels in the background-proper and in background-artifacts not attached to the foreground-background border of the breast eliminated. This is accomplished by starting from a seed point along the chest wall in the middle of the image, which is assumed to always be within the breast, and successively marking pixels of value binary one which are adjacent to the seed pixel or an already marked pixel. All pixels not marked are set to binary zero.

Ideally, a finally segmented image should be the result at this point. In some cases, however, edge artifacts close to the gland may be attached to the foreground, or there might be some discontinuity in the chest wall at the edge of the film. These remaining connections of background to foreground and re-entrant discontinuities in the foreground-background border are detected by comparing the border between background and foreground with a generally expected curvature profile in each contour section, for example, a monotonic variation in second derivative. The areas not satisfying the expected profile lying on the background are removed and lying on the foreground side are filled in. This is followed by close and open morphological operations to smooth rough edges using structuring elements of sizes 15×15 and 3×3 respectively. The result is the segmented image 58.

In the contour tracing and smoothing procedure 60, the foreground-background border is traced, for example using the standard algorithm in the aforementioned book by Pavlidis at page 143. Depending on the amount of noise in the background, the traced contour may or may not be as smooth as desired. To smooth the contour, first the dominant points on the curve are detected, for example, using the algorithm in Teh, C., "On the detection of dominant points on digital curves", IEEE Transactions on Pattern Analysis and Machine Intelligence, Vol. 11, No. 8. August 1989. Dominant points are the extrema on a digital curve. Non-dominant points (points on a constant run) are eliminated. Next, the jaggedness of the curve is removed by using a smoothing scheme based on the concept of the convex hull of an object. The rationale behind this is that if the detected skinline does not match the true skinline exactly, it is better to include some of the background than to exclude some of the breast tissue. Thus, the curve is pushed out towards the background and at the same time it is smoothed.

The remaining points in the contour representing the skinline curve are connected together to produce the detected skinline 62 which is superimposed as an outline of the original (or later processed) image 40 by combination operation 64. Further, the binary image having the detected skinline as the foreground-background border serves as a binary mask marking the locations of all pixels within the foreground.

It has been found experimentally that the segmentation and skinline detection can be accomplished in several minutes for arrays of up to 500,000 pixels when implemented in non-optimized Interactive Data Language code on a Sun Sparcstation 1+. Further, images resulting from photo-stimuable phosphor computed radiography had no background artifacts in the vicinity of the breast and the contour resulting from the tracing operation of procedure 60 in the vast majority of trials actually did not require smoothing. The elimination of unnecessary operations for such images results in a processing time of about 10 seconds to detect the skinline.

It should now be appreciated that the objects of the present invention have been satisfied. While the present invention has been described in particular detail, numerous modifications are possible within the intended spirit and scope of the invention.

What is claimed is:

1. A method of producing a computer-enhanced mammogram comprising:

irradiating a breast of a subject being examined with X-ray radiation in a predetermined viewing direction;

receiving the X-ray radiation exiting the breast and its external surround from said viewing direction within a two-dimensional field;

producing digital signals as a function of the X-ray radiation received, which digital signals correspond to an input two-dimensional array of digital pixels;

in response to said signals, storing said input two-dimensional array of digital pixels in a digital memory means accessible to a computer;

with said computer, processing the stored two-dimensional array of digital pixels to produce an output two-dimensional array of digital pixels in which one or more features of said input array is marked or enhanced, including detecting which pixels in said input array correspond to a skinline that forms a boundary between the breast and its external surround, and setting the values of pixels in the output array corresponding to the detected skinline to values that mark the detected skinline; and displaying the output array of digital pixels as an image on a display means;

wherein the skinline of said breast as viewed from said viewing direction is dividable to include at least first and second contour sections and said detecting said skinline includes a step of performing a coarse segmentation between the breast and its external surround as a function of a spatial derivative computed only in a predetermined derivative direction at pixels at least in the vicinity of the skinline, said predetermined derivative direction being a first fixed direction in the vicinity of the skinline in the first contour section, and a second fixed direction, different from said first direction, in the vicinity of the skinline in the second contour section, at least one of said first and second fixed directions making a substantial angle with respect to a normal to a chest wall of the subject.

2. The method as claimed in claim 1, wherein said first fixed direction is approximately normal to the skinline within said first contour section and said second fixed direction is approximately normal to the skinline within said second contour section.

3. The method as claimed in claim 1, wherein the skinline of said breast as viewed from said viewing direction is dividable to also include a third contour section, and said spatial derivative is in a third fixed direction, different from said first and second directions, in the third contour section.

4. The method as claimed in claim 1, wherein said coarse segmentation is performed by forming a binary array of two-dimensional pixels, in which pixels in a first region corresponding to the breast have a first binary value and pixels in a second region corresponding to the external surround have a second binary value, opposite to the first binary value, and wherein said detecting the skinline further comprises the steps of tracing a contour between the first and second regions; locating dominant points on the traced contour, and smoothing local variations between the located dominant points.

5. The method as claimed in claim 2, wherein said coarse segmentation is performed by forming a binary array of two-dimensional pixels, in which pixels in a first region corresponding to the breast have a first binary value and pixels in a second region corresponding to the external surround have a second binary value, opposite to the first binary value, and wherein said detecting the skinline further comprises the steps of tracing a contour between the first and second regions; locating dominant points on the traced contour, and smoothing local variations between the located dominant points.

6. A system for producing a computer-enhanced mammogram comprising:

means including an X-ray source, for irradiating a breast of a subject being examined with X-ray radiation in a predetermined viewing direction;

means for receiving the X-ray radiation exiting the breast and its external surround from said viewing direction within a two-dimensional field;

means for producing digital signals as a function of the X-ray radiation received, which digital signals correspond to an input two-dimensional array of digital pixels;

means for, in response to said signals, storing said input two-dimensional array of digital pixels in a digital memory means accessible to a computer;

said computer comprising means for processing the stored two-dimensional array of digital pixels to produce an output two-dimensional array of digital pixels in which one or more features of said input array is marked or enhanced, including means for detecting which pixels in said input array correspond to a skinline that forms a boundary between the breast and its external surround, and means for setting the values of pixels in the output array corresponding to the detected skinline to values that mark the detected skinline; and display means for displaying the output array of digital pixels as an image on a display means;

wherein the skinline of said breast as viewed from said viewing direction is dividable to include at least first and second contour sections and said means for detecting said skinline includes means for performing a coarse segmentation between the breast and its external surround as a function of a spatial derivative computed only in a predetermined derivative direction at pixels at least in the vicinity of the skinline, said predetermined derivative direction being a first fixed direction in the vicinity of the skinline in the first contour section, and a second fixed direction, different from said first direction, in the vicinity of the skinline in the second contour section, at least one of said first and second fixed directions making a substantial angle with respect to a normal to a chest wall of the subject.

7. The system as claimed in claim 6, wherein said first fixed direction is approximately normal to the skinline within said first contour section and said second fixed direction is approximately normal to the skinline within said second contour section.

8. The system as claimed in claim 6, wherein the skinline of said breast as viewed from said viewing direction is dividable to also include a third contour section, and said spatial derivative is in a third fixed direction, different from said first and second directions, in the third contour section.

9. The system as claimed in claim 6, wherein said means for performing a coarse segmentation comprises means for forming a binary array of two-dimensional pixels, in which pixels in a first region corresponding to the breast have a first binary value and pixels in a second region corresponding to the external surround have a second binary value, opposite to the first binary value, and wherein said means for detecting the skinline further comprises means for tracing a contour between the first and second regions; means for locating dominant points on the traced contour, and means for smoothing local variations between the located dominant points.

10. The system as claimed in claim 7, wherein said means for performing a coarse segmentation comprises means for forming a binary array of two-dimensional pixels, in which pixels in a first region corresponding to the breast have a first binary value and pixels in a second region corresponding to the external surround have a second binary value, opposite to the first binary value, and wherein said means for detecting the skinline further comprises means for tracing a contour between the first and second regions; means for locating dominant points on the traced contour, and means for smoothing local variations between the located dominant points.

11. A system for segmenting a mammogram between breast and its external surround comprising:

means including an X-ray source, for irradiating a breast of a subject being examined with X-ray radiation in a predetermined viewing direction;

means for receiving the X-ray radiation exiting the breast and its external surround from said viewing direction within a two-dimensional field;

means for producing digital signals as a function of the X-ray radiation received, which digital signals correspond to an input two-dimensional array of digital pixels;

means for, in response to said signals, storing said input two-dimensional array of digital pixels in a digital memory means accessible to a computer;

wherein the skinline of said breast as viewed from said viewing direction is dividable to include at least first and second contour sections and said computer comprises means for segmenting said input two-dimensional array of digital pixels between the breast and its external surround as a function of a spatial derivative computed only in a predetermined derivative direction at pixels at least in the vicinity of the skinline, said predetermined derivative direction being a first fixed direction in the vicinity of the skinline in the first contour section, and a second fixed direction, different from said first direction, in the vicinity of the skinline in the second contour section, at least one of said first and second fixed directions making a substantial angle with respect to a normal to a chest wall of the subject.

12. The system as claimed in claim 11, wherein said first fixed direction is approximately normal to the skinline within said first contour section and said second fixed direction is approximately normal to the skinline within said second contour section.

13. The system as claimed in claim 11, wherein the skinline of said breast as viewed from said viewing direction is dividable to also include a third contour section, and said spatial derivative is in a third fixed direction, different from said first and second directions, in the third contour section.

* * * * *